(12) United States Patent
Mizuochi et al.

(10) Patent No.: US 10,832,709 B2
(45) Date of Patent: Nov. 10, 2020

(54) DISK DEVICE

(71) Applicants:Kabushiki Kaisha Toshiba, Minato-ku, Tokyo (JP); Toshiba Electronic Devices & Storage Corporation, Minato-ku, Tokyo (JP)

(72) Inventors: Kenji Mizuochi, Kamakura Kanagawa (JP); Takeo Hayashi, Kawasaki Kanagawa (JP); Kouichi Toukairin, Kawasaki Kanagawa (JP)

(73) Assignees: Kabushiki Kaisha Toshiba, Tokyo (JP); Toshiba Electronic Devices & Storage Corporation, Tokyo (JP)

( * ) Notice: Subject to any disclaimer, the term of this patent is extended or adjusted under 35 U.S.C. 154(b) by 0 days.

(21) Appl. No.: 16/560,338

(22) Filed: Sep. 4, 2019

(65) Prior Publication Data
US 2020/0243109 A1    Jul. 30, 2020

(30) Foreign Application Priority Data

Jan. 30, 2019   (JP) .................................. 2019-014676

(51) Int. Cl.
*G11B 5/31* (2006.01)
*G11B 5/10* (2006.01)
*G11B 25/04* (2006.01)

(52) U.S. Cl.
CPC .............. *G11B 5/3133* (2013.01); *G11B 5/10* (2013.01); *G11B 25/043* (2013.01)

(58) Field of Classification Search
CPC ........ G11B 5/3133; G11B 5/10; G11B 25/043
USPC ............................................. 360/99.2–99.25
See application file for complete search history.

(56) References Cited

U.S. PATENT DOCUMENTS

| | | | | |
|---|---|---|---|---|
| 9,047,896 B1 * | 6/2015 | Kudo | .................. | G11B 5/5552 |
| 2008/0086739 A1 * | 4/2008 | Naruse | ................ | G11B 25/043 |
| | | | | 720/600 |
| 2011/0273834 A1 * | 11/2011 | Moriai | ...................... | G06F 1/20 |
| | | | | 361/679.32 |
| 2015/0138669 A1 * | 5/2015 | Kudo | .................. | G11B 5/4826 |
| | | | | 360/99.08 |
| 2016/0270266 A1 * | 9/2016 | Ozawa | ............... | G11B 33/1406 |
| 2018/0270943 A1 * | 9/2018 | Suzuki | ................ | H05K 1/0203 |

FOREIGN PATENT DOCUMENTS

| | | |
|---|---|---|
| JP | 2003-101270 A | 4/2003 |
| JP | 2004-326967 A | 11/2004 |
| JP | 3952184 B2 | 8/2007 |

* cited by examiner

*Primary Examiner* — Allen T Cao

(57) ABSTRACT

According to one embodiment, a disk device includes a housing including a bottom wall including a protrusion with a first surface, a recording medium arranged in the housing, a printed circuit board attached to the bottom wall, an electronic component mounted on the printed circuit board and including a second surface facing the first surface, and a radiation sheet including a third surface which is contact with the first surface, and a fourth surface which is in contact with the second surface. An area of the first surface is less than an area of the third surface of the radiation sheet, or an area of the second surface is less than an area of the fourth surface of the radiation sheet.

7 Claims, 4 Drawing Sheets

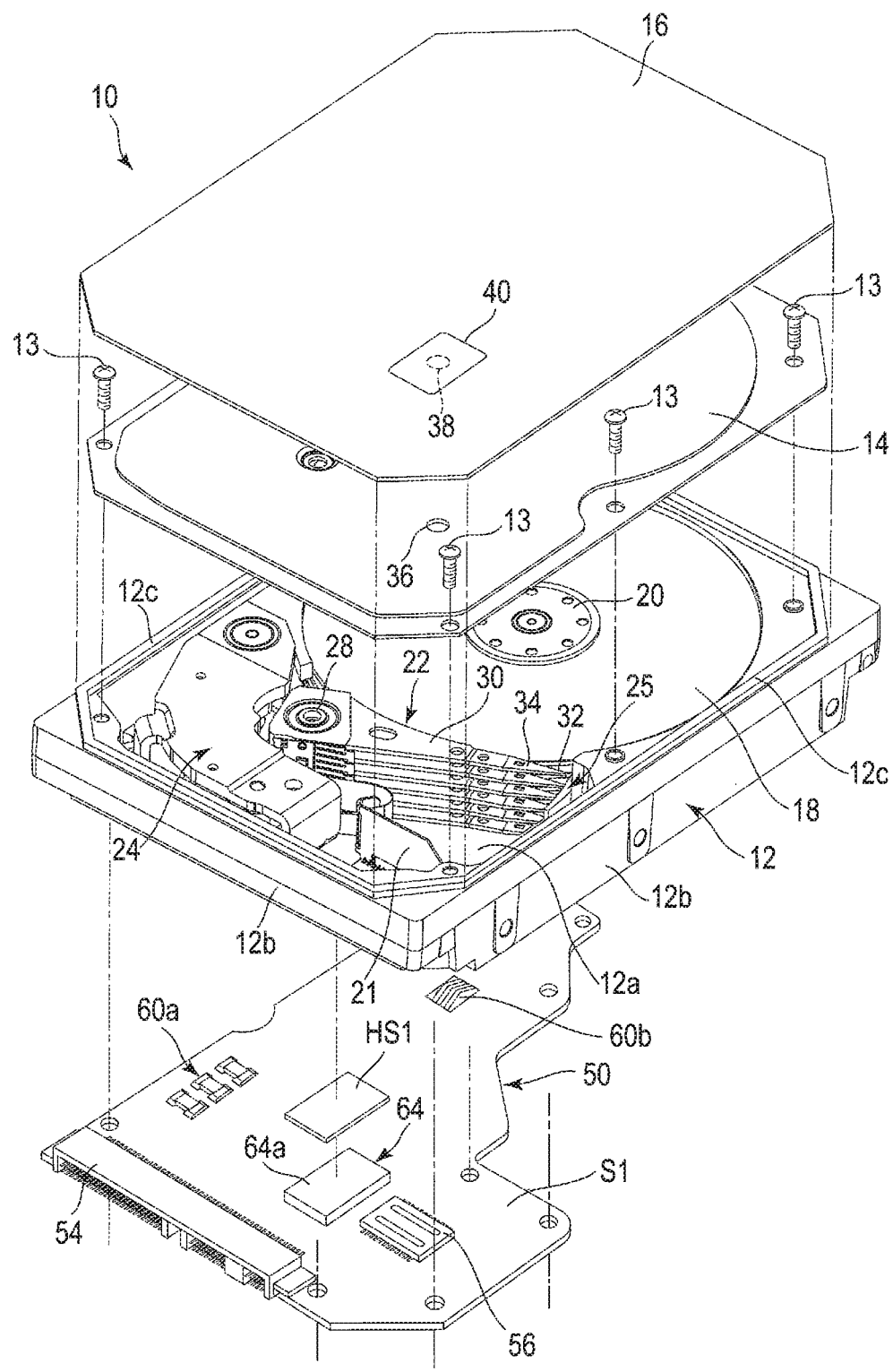
F I G. 1

{DISK DEVICE}

DISK DEVICE

CROSS-REFERENCE TO RELATED APPLICATIONS

This application is based upon and claims the benefit of priority from Japanese Patent Application No. 2019-014676, filed Jan. 30, 2019, the entire contents of which are incorporated herein by reference.

FIELD

Embodiments described herein relate generally to a disk device.

BACKGROUND

As a disk device, for example, a magnetic disk drive (HDD) generally comprises a housing in which a disk-shaped recording medium, a magnetic head, an actuator for moving the magnetic head, etc., are accommodated, and a printed circuit board (PCB) facing the bottom surface of the housing. Various electronic components, such as a plurality of semiconductor elements and connectors, are mounted on the printed circuit board. A radiation sheet is provided between, of the semiconductor elements, a CPU (large-scale integrated circuit [LSI]) in which the amount of heat generation is large and the bottom wall of the housing. The heat of the LSI is released to the housing via the radiation sheet.

If the radiation sheet is located between the housing and the LSI, and compressed thereby such that the radiation sheet adheres to the housing and the LSI, this is an effective way to improve the heat radiation efficiency. However, in this case, a load is applied to the LSI. In this way, a crack may be caused in soldered portions of electronic components such as an LSI.

To improve the heat radiation efficiency, the use of a radiation sheet with high radiation performance is also effective. However, a radiation sheet with high radiation performance is comparatively hard. When the amount of compression is increased, the limit of the pressure resistance of the LSI is exceeded. Thus, it is difficult to increase the amount of compression. Because of the variation in the thickness of the radiation sheet or the variation in the gap between the LSI and the housing, a part or the whole surface of the radiation sheet may not be in contact with the LSI or housing. In this way, the radiation performance may be degraded.

BRIEF DESCRIPTION OF THE DRAWINGS

FIG. 1 is an exploded perspective view of a hard disk drive (HDD) according to a first embodiment.

DETAILED DESCRIPTION

Figure 2:
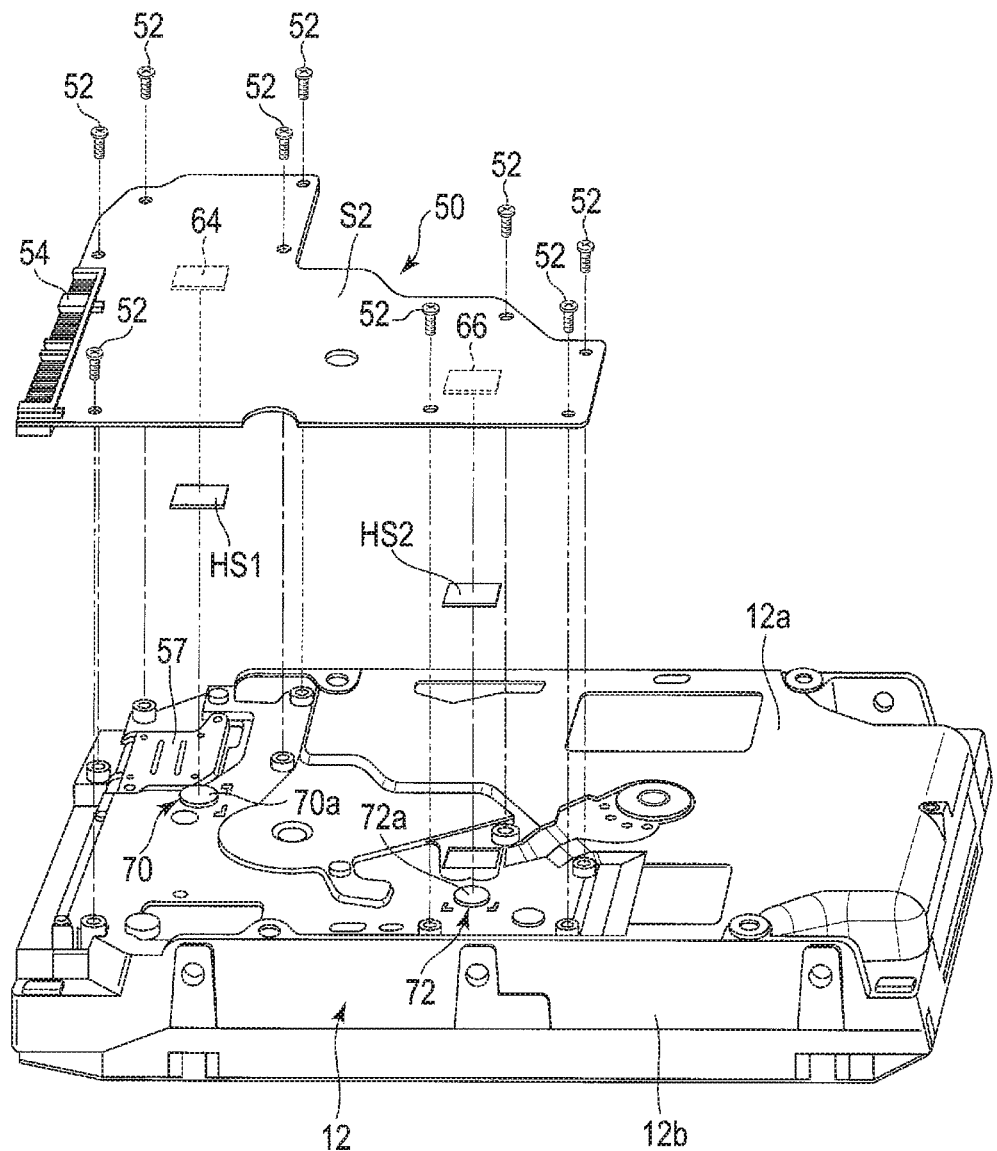
FIG. 2 is an exploded perspective view showing the bottom wall side of the HDD and a printed circuit board according to the first embodiment.

Various embodiments will be described hereinafter with reference to the accompanying drawings.

In general, according to one embodiment, a disk device comprises a housing comprising a bottom wall comprising a protrusion comprising a first surface; a recording medium arranged in the housing; a printed circuit board attached to the bottom wall; an electronic component mounted on the printed circuit board and comprising a second surface facing the first surface; and a radiation sheet comprising a third surface which is contact with the first surface, and a fourth surface which is in contact with the second surface. An area of the first surface is less than an area of the third surface of the radiation sheet, or an area of the second surface is less than an area of the fourth surface of the radiation sheet.

The disclosure is merely an example, and proper changes in keeping with the spirit of the invention, which are easily conceivable by a person of ordinary skill in the art, come within the scope of the invention as a matter of course. In addition, in some cases, in order to make the description clearer, the widths, thicknesses, shapes and the like, of the respective parts are illustrated schematically in the drawings, rather than as an accurate representation of what is implemented. However, such schematic illustration is merely exemplary, and in no way restricts the interpretation of the invention. In addition, in the specification and drawings, the same elements as those described in connection with preceding drawings are denoted by like reference numbers, and detailed description thereof is omitted unless necessary.

First Embodiment

FIG. 1 is an exploded perspective view of an HDD according to a first embodiment. FIG. 2 is an exploded perspective view showing the bottom wall side of the HDD and a printed circuit board.

As shown in FIG. 1, an HDD comprises a housing 10 which is substantially rectangular. The housing 10 comprises a base 12 having an open-topped rectangular box shape, an inner cover 14 secured to the base 12 by a plurality of screws 13 and blocking the upper end opening of the base 12, and an outer cover (top cover) 16 overlapping the inner cover 14 and comprising a peripheral portion welded to the base 12. The base 12 comprises a rectangular bottom wall 12a facing the inner cover 14 across an intervening gap, and sidewalls 12b provided upright along the periphery of the bottom wall 12a. For example, the base 12 is integrally formed of aluminum with the bottom wall 12a and the sidewalls 12b. The sidewalls 12b include a pair of long-side walls facing each other and a pair of short-side walls facing each other. A securing rib 12c formed in a substantially rectangular frame protrudes from the upper end surfaces of the sidewalls 12b.

For example, the inner cover 14 is formed of stainless steel like a rectangular plate. The peripheral portion of the inner cover 14 is secured to the upper surfaces of the sidewalls 12b of the base 12 by the screws 13 and located inside the securing rib 12c. The outer cover 16 is formed of, for example, aluminum like a rectangular plate. The planar size of the outer cover 16 is slightly larger than that of the inner cover 14. The whole peripheral portion of the outer cover 16 is welded to the securing rib 12c of the base 12 such that the outer cover 16 is air-tightly fixed to the base 12.

The inner cover 14 and the outer cover 16 comprise a vent hole 36 and a vent hole 38, respectively. The internal space of the housing 10 communicates with the outside through the vent holes 36 and 38. The air inside the housing 10 is discharged through the vent holes 36 and 38. Further, through the vent holes 36 and 38, a low-density gas (inactive gas) having a density less than the density of air, for example, helium, is filled into the housing 10. For example, a sealing material 40 is attached to the outer surface of the outer cover 16 so as to close the vent hole 38.

A plurality of, for example, five to nine magnetic disks 18 as recording media and a spindle motor 20 as a drive unit which supports and rotates the magnetic disks 18 are provided in the housing 10. The spindle motor 20 is provided on the bottom wall 12a. Each magnetic disk 18 has a diameter of, for example, 95 mm (3.5 inch), and comprises a magnetic recording layer on the upper surface and/or lower surface of the magnetic disk. The magnetic disks 18 are fit on the hub (not shown) of the spindle motor 20 such that they are coaxial with each other. The magnetic disks 18 are secured to the hub by a clamp spring. This structure allows each magnetic disk 18 to be supported in a state parallel to the bottom wall 12a of the base 12. The magnetic disks 18 are rotated at a predetermined number of revolutions by the spindle motor 20.

In the present embodiment, five to nine magnetic disks 18 are accommodated in the housing 10. However, the number of magnetic disks 18 is not limited to this example. A single magnetic disk 18 may be accommodated in the housing 10.

A plurality of magnetic heads 32 and a head stack assembly (actuator) 22 are provided in the housing 10. The magnetic heads 32 record and reproduce data with respect to the magnetic disks 18. The head stack assembly 22 supports the magnetic heads 32 to be movable with respect to the magnetic disks 18. Further, a voice coil motor (VCM) 24, a ramped loading mechanism 25 and a board unit (wiring member) 21 are provided in the housing 10. The VCM 24 rotates the head stack assembly 22 and determines the position of the head stack assembly 22. The ramped loading mechanism 25 holds the magnetic heads 32 at an unload position spaced apart from the magnetic disks 18 when the magnetic heads 32 move to the outermost circumference of the magnetic disks 18. Electronic components such as a conversion connector are mounted on the board unit 21. The board unit 21 is structured by a flexible printed circuit (FPC). The FPC is electrically connected to the voice coil of the VCM 24 and the magnetic heads 32 via a relay FPC on the head stack assembly 22.

The head stack assembly 22 comprises a rotatable bearing unit 28, a plurality of arms 30 extending from the bearing unit 28, and suspensions 34 extending from the respective arms 30. The magnetic heads 32 are supported on the distal end portions of the respective suspensions 34.

As shown in FIG. 1 and FIG. 2, a control circuit board (printed circuit board) 50 faces the outer surface of the bottom wall 12a of the base 12. The control circuit board 50 is secured to the bottom wall 12a by a plurality of screws 52 and faces the outer surface of the bottom wall 12a across an intervening gap. The control circuit board 50 is formed like a substantially rectangular plate and comprises a first main surface S1 facing the bottom wall 12a and a second main surface S2 opposite to the first main surface S1.

A plurality of electronic components are mounted on the first main surface S1 of the control circuit board 50. For example, a plurality of semiconductor chips 60a, two semiconductor elements (for example, large-scale integrated circuits [LSIs]) 64 and 66 and a relay connector 56 connectable to the board unit 21 are mounted. The LSIs 64 and 66 are rectangular, and comprise flat second contact surfaces (second surfaces) 64a and 66a facing the bottom wall 12a, respectively. A connection terminal 60b for the spindle motor 20 is provided on the first main surface S1. Further, an interface connector 54 connectable to an external device is mounted in a side edge of the control circuit board 50.

Two bosses (protrusions) 70 and 72 which function as first contact portions protrude from the outer surface of the bottom wall 12a of the base 12. The two bosses 70 and 72 face the LSIs 64 and 66 of the control circuit board 50. The bosses 70 and 72 comprise flat first contact surfaces (first surfaces) 70a and 72a substantially parallel to the outer surface of the bottom wall 12a, respectively. In the present embodiment, the bosses 70 and 72 and the first contact surfaces 70a and 72a are, for example, circular. It should be noted that the bosses or the first contact surfaces may not be circular. Various shapes can be selected for the bosses and the first contact surfaces. For example, the bosses and the first contact surfaces may be rectangular or polygonal.

In a state where the control circuit board 50 is attached to a predetermined position of the base 12, the relay connector 56 is connected to a connector 57 provided on the bottom wall 12a. The connector 57 is connected to the conversion connector of the board unit 21. The connection terminal 60b is connected to the connection terminal of the spindle motor 20. The control unit of the control circuit board 50 controls the operation of the VCM 24 and the magnetic heads 32 via the board unit 21 and controls the operation of the spindle motor 20 via the connection terminal 60b. The second contact surfaces 64a and 66a of the two LSIs 64 and 66 face the first contact surfaces 70a and 72a of the bosses 70 and 72, respectively.

Figure 3:
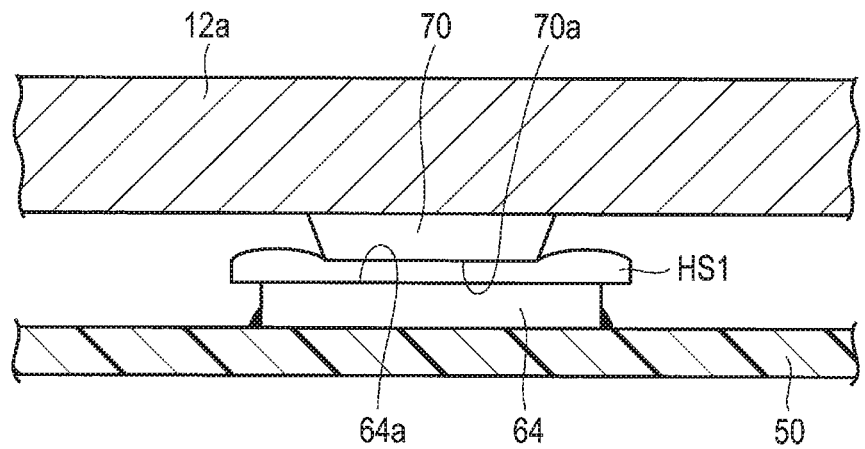
FIG. 3 is a cross-sectional view of the HDD and shows the contact state of an electronic component, the contact portion of a housing and a radiation sheet.

In the present embodiment, a radiation sheet HS1 is provided between the boss 70 and the LSI 64. A radiation sheet HS2 is provided between the boss 72 and the LSI 66. FIG. 3 is a cross-sectional view of the bottom wall and the control circuit board and shows the contact state of the LSI 64, the radiation sheet HS1 and the boss 70. As shown in FIG. 3, the radiation sheet HS1 comprises an upper surface (third surface) and a lower surface (fourth surface), and is inserted between the boss 70 and the LSI 64. The upper surface is in contact with the first contact surface 70a of the boss 70. The lower surface is in contact with the second contact surface 64a of the LSI 64. When the control circuit board 50 is screwed to the bottom wall 12a in a state pressed onto the bottom wall 12a side by a predetermined pressing force, the radiation sheet HS1 is pressed by a predetermined contact pressure by the boss 70 and the LSI 64, and is provided in a state compressed by a predetermined amount of compression. The heat of the LSI 64 is transmitted to the bottom wall 12a via the radiation sheet HS1 and the boss 70, and is released to the outside through the bottom wall 12a. Thus, the LSI 64 is cooled down, and an excessive increase in temperature is prevented.

For example, the radiation sheet HS1 has a thickness of 0.7 mm and a radiation performance of approximately 2 W, and is comparatively soft. For example, the amount of compression of the radiation sheet HS1 is 0.2 to 0.4 mm for a contact pressure of 10 kgf/cm$^2$. The hardness of the radiation sheet HS1 changes depending on various elements. For example, the hardness of the radiation sheet changes in accordance with the content of glass fiber and carbon fiber.

In the present embodiment, the area of the first contact surface 70a of the boss 70 is less than that of the radiation sheet HS1 (in other words, that of the third surface and the fourth surface) and that of the second contact surface 64a of the LSI 64. The first contact surface 70a is entirely in contact with the radiation sheet HS1 and compresses the radiation sheet HS1. For example, the area of the first contact surface 70a is set to 30 to 70% of the area of the radiation sheet HS1. For example, the radiation sheet HS1 is rectangular, and has an area greater than the area of the second contact surface 64a of the LSI 64. The second contact surface 64a is entirely in contact with the radiation sheet HS1.

Figure 4:
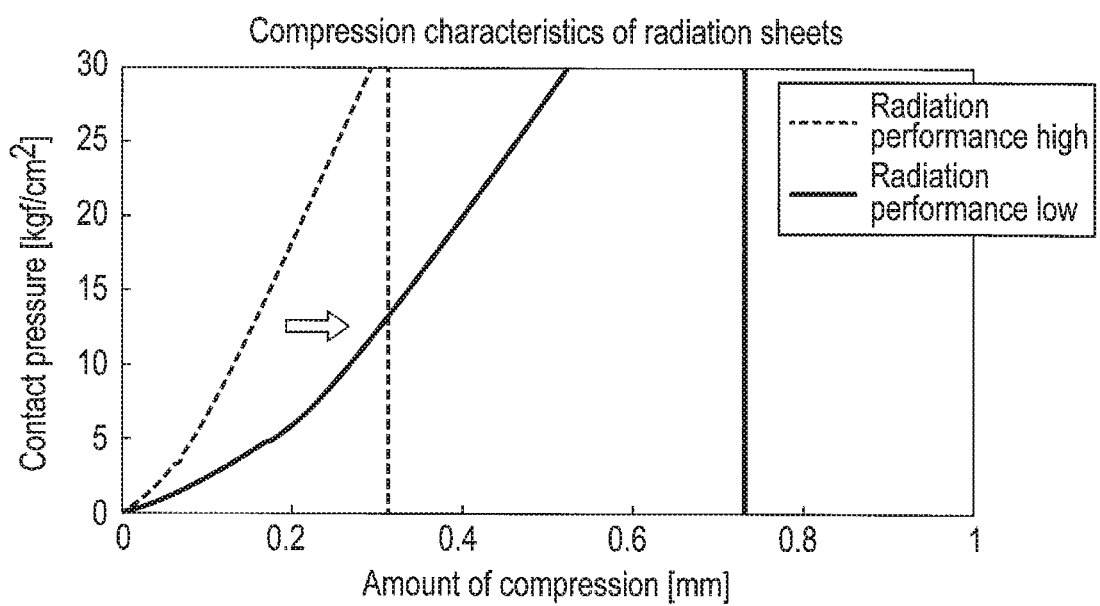
FIG. 4 shows a comparison between two types of radiation sheets in terms of the relationship between the amount of compression of the radiation sheets and the contact pressure.

FIG. 4 shows the compression characteristics of radiation sheets. In FIG. 4, the compression characteristics of the radiation sheet of the present embodiment (low radiation performance) are compared with the compression characteristics of the radiation sheet of a comparative example (high radiation performance).

Figure 5:
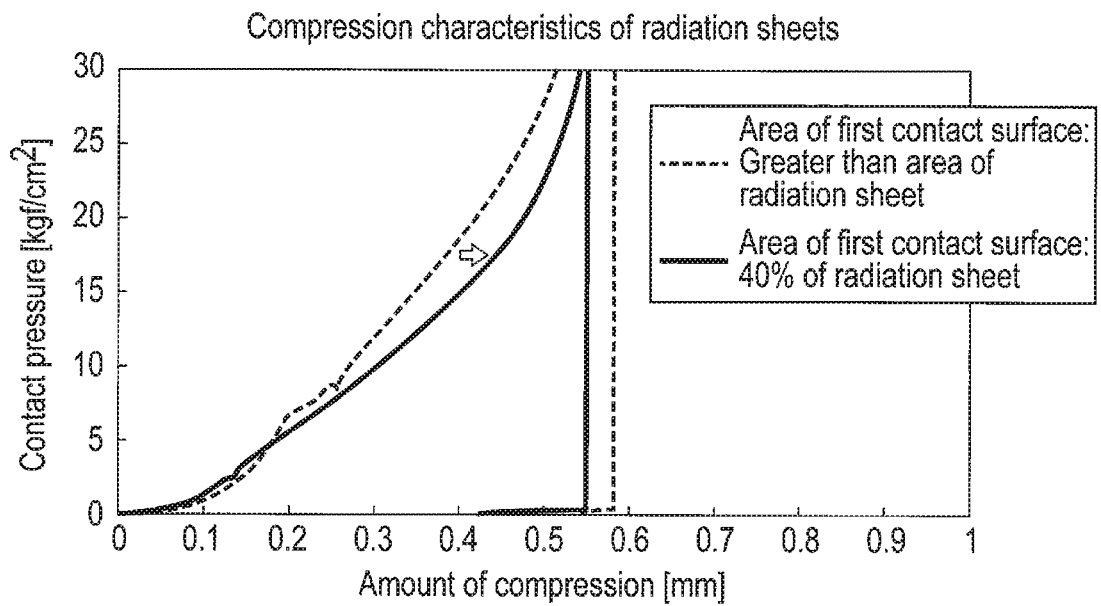
FIG. 5 shows a comparison between the areas of two types of contact surfaces on the housing side in terms of the relationship between the amount of compression of the radiation sheets and the contact pressure.

FIG. 5 shows the compression characteristics of radiation sheets in accordance with the area of the first contact surface of the contact portion by comparing the present embodiment (the area of the first contact surface is 40% of the area of the radiation sheet) with a comparative example (the area of the first contact surface is greater than that of the radiation sheet).

As shown in FIG. 4, since the radiation sheet of the comparative example with high radiation performance is comparatively hard, when the amount of compression is increased to cause the radiation sheet to adhere tightly to the LSI, the contact pressure acting on the LSI is increased. For example, when the amount of compression is 0.2 mm, the contact pressure is 18 kgf/cm$^2$. In the comparatively soft radiation sheet HS1 with low radiation performance like the present embodiment, when the amount of compression is 0.2 mm, the contact pressure acting on the LSI is approximately 6 kgf/cm$^2$. Thus, the contact pressure is approximately one-third of that of the comparative example. It is clear that the comparatively soft radiation sheet with low radiation performance allows the amount of compression to be increased with a low contact pressure and allows the adherence between the LSI and the contact portion to be improved in comparison with the comparative example.

As shown in FIG. 5, in a case where the area of the first contact surface, the area of the radiation sheet and the area of the second contact surface of the LSI are equal to each other like the comparative example, for example, a contact pressure of 13 kgf/cm$^2$ is needed to obtain an amount of compression of 0.3 mm. In a case where the area of the first contact surface is less than that of the radiation sheet like the present embodiment, here, approximately 40% of the area of the radiation sheet, the contact pressure is approximately 10 kgf/cm$^2$ when the amount of compression is 0.3 mm. Thus, the contact pressure can be decreased by approximately 3 kgf/cm$^2$ from the comparative example.

As described above, in the present embodiment, the area of the first contact surface 70a of the base 12 is set so as to be less than that of the radiation sheet HS1. In this way, the amount of compression of the radiation sheet HS1 can be increased in a state where the contact pressure acting on the LSI 64 is low. Thus, the adhesion of the radiation sheet HS1 to the first contact surface 70a and the second contact surface 64a can be improved. This structure allows the heat radiation efficiency of the LSI 64 to be increased without damaging the LSI 64, in other words, without exceeding the limit of the pressure resistance of the LSI 64. Furthermore, for example, when the amount of compression of the radiation sheet HS1 is 0.2 to 0.4 mm for a contact pressure of 10 kgf/cm$^2$, and thus, the radiation sheet HS1 is comparatively soft, a desired amount of compression can be obtained with a lower contact pressure.

Although not shown in the drawings, the other LSI 66, radiation sheet HS2 and boss 72 have the same structures and the same relationships of areas as the LSI 64, radiation sheet HS1 and boss 70 shown in FIG. 3. Thus, the amount of compression of the radiation sheet HS2 can be increased in a state where the contact pressure acting on the LSI 66 is low. The adhesion and radiation performance of the radiation sheet HS2 can be improved.

As explained above, the present embodiment allows the acquisition of a disk device which can improve the heat radiation efficiency without exceeding the limit of the pressure resistance of electronic components.

Now, this specification explains an HDD according to another embodiment. In the embodiment explained below, portions equivalent to those of the first embodiment are denoted by the same reference numbers and detailed explanation thereof is simplified or omitted, such explanation being mainly given to portions different from those of the first embodiment.

Second Embodiment

Figure 6:
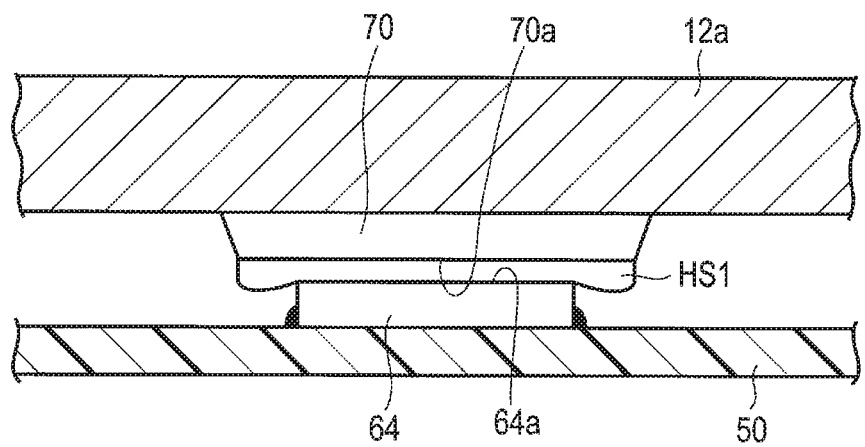
FIG. 6 is a cross-sectional view of an HDD according to a second embodiment, and shows the contact state of an electronic component, the contact portion of a housing and a radiation sheet in the HDD.

FIG. 6 is a cross-sectional view of the base bottom wall of an HDD and a control circuit board according to a second embodiment. As shown in FIG. 6, in the second embodiment, a radiation sheet HS1 is provided between the boss (contact portion) 70 of the bottom wall 12a of a base 12 and an LSI (electronic component) 64 on a control circuit board 50. The radiation sheet HS1 is inserted between the boss 70 and the LSI 64, and is in contact with the first contact surface 70a of the boss 70 and the second contact surface 64a of the LSI 64. When the control circuit board 50 is screwed to the bottom wall 12a in a state pressed onto the bottom wall 12a side by a predetermined pressing force, the radiation sheet HS1 is pressed by a predetermined contact pressure by the boss 70 and the LSI 64, and is provided in a state compressed by a predetermined amount of compression.

For example, the radiation sheet HS1 has a thickness of 0.7 mm and a radiation performance of approximately 3 W, and is comparatively soft. For example, the amount of compression is 0.2 to 0.4 mm for a contact pressure of 10 kgf/cm$^2$.

In the second embodiment, the area of the radiation sheet HS1 is greater than that of the second contact surface 64a of the LSI 64. In a similar manner, the area of the first contact surface 70a of the boss 70 is greater than that of the second contact surface 64a of the LSI 64, and is substantially equal to that of the radiation sheet HS1. In other words, the area of the second contact surface 64a of the LSI 64 is less than that of the radiation sheet HS1 and that of the first contact area 70a of the boss 70. The second contact surface 64a is entirely in contact with the radiation sheet HS1 and compresses the radiation sheet HS1. The radiation sheet HS1 and the first contact surface 70a are, for example, rectangular. The first contact surface 70a is entirely in contact with the radiation sheet HS1.

In the second embodiment, the other structures of the HDD are the same as those of the HDD of the above first embodiment.

As described above, in the present embodiment, the area of the second contact surface 64a of the LSI 64 is set so as to be less than that of the radiation sheet HS1. In this way, the amount of compression of the radiation sheet HS1 can be increased in a state where the contact pressure acting on the LSI 64 is low. Thus, the adhesion of the radiation sheet HS1 to the first contact surface 70a and the second contact surface 64a can be improved. This structure allows the heat radiation efficiency of the LSI 64 to be increased without damaging the LSI 64, in other words, without exceeding the limit of the pressure resistance of the LSI 64. Furthermore, for example, when the amount of compression of the radiation sheet HS1 is 0.2 to 0.4 mm for a contact pressure of 10 kgf/cm$^2$, and thus, the radiation sheet HS1 is comparatively soft, a desired amount of compression can be obtained with a lower contact pressure.

Thus, the second embodiment also allows the acquisition of a disk device which can improve the heat radiation efficiency without exceeding the limit of the pressure resistance of electronic components.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

For example, the electronic components which release heat by the radiation sheets are not limited to the LSIs. Another electronic component in which the amount of heat generation is large may be applied. The shapes, sizes, etc., of the radiation sheets, the first contact surfaces and the second contact surfaces are not limited to the above embodiments, and may be changed in various ways depending on the need.

What is claimed is:

1. A disk device comprising:
a housing comprising a bottom wall comprising an outer surface and a protrusion provided on the outer surface and having a first surface;
a recording medium arranged in the housing;
a printed circuit board attached to the bottom wall to oppose the outer surface of the bottom wall;
an electronic component mounted on the printed circuit board and having a second surface facing the first surface; and
a radiation sheet provided between the first surface and the second surface and having a third surface which is in contact with the first surface and apart from the outer surface of the bottom wall, and a fourth surface which is opposite to the third surface, in contact with the second surface, and apart from the printed circuit board, wherein
an area of the first surface is less than an area of the third surface of the radiation sheet and is less than an area of the second surface, and the first surface compresses the radiation sheet, or an area of the second surface is less than an area of the fourth surface of the radiation sheet and is less than an area of the third surface, and the second surface compresses the radiation sheet.

2. The disk device of claim 1, wherein
the area of the third surface of the radiation sheet is greater than the area of the first surface of the protrusion and greater than the area of the second surface of the electronic component, the third surface includes a first region contacting the first surface and a second region located around the first area and facing the outer surface of the bottom wall with a gap, and the area of the fourth surface of the radiation sheet is greater than the area of the first surface and greater than the area of the second surface.

3. The disk device of claim 1, wherein
the area of the second surface of the electronic component is greater than the area of the first surface of the protrusion.

4. The disk device of claim 1, wherein
the area of the second surface of the electronic component is less than the area of the fourth surface of the radiation sheet and the area of the first surface of the protrusion, and the second surface is entirely in contact with the radiation sheet.

5. The disk device of claim 1, wherein
the radiation sheet is a radiation sheet in which an amount of compression is 0.2 to 0.4 mm for a contact pressure of 10 kgf/cm$^2$.

6. The disk device of claim 1, wherein
the first surface is circular.

7. A disk device comprising:
a housing comprising a bottom wall comprising a contact portion having a first surface;
a recording medium arranged in the housing;
a printed circuit board facing the bottom wall and attached to the bottom wall;
an electronic component mounted on the printed circuit board and having a second surface facing the first surface; and
a radiation sheet arranged between the first surface and the second surface and being in contact with the first surface and the second surface, wherein
one of the first and second surfaces has an area less than an area of the radiation sheet, is entirely in contact with the radiation sheet and compresses the radiation sheet.

* * * * *